US008935709B2

(12) United States Patent
Kache et al.

(10) Patent No.: US 8,935,709 B2
(45) Date of Patent: *Jan. 13, 2015

(54) MONITORING INFORMATION ASSETS AND INFORMATION ASSET TOPOLOGIES

(75) Inventors: Holger Kache, San Jose, CA (US);
Rajiv S. Kadayam, Fairfax, VA (US);
Michael John Morton, Durham, NC (US); Alan P. Plante, Fairfax, VA (US);
Robert Clarence Webber, III, Fairfax, VA (US)

(73) Assignee: International Business Machines Corporation, Armonk, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 13/422,266

(22) Filed: Mar. 16, 2012

(65) Prior Publication Data
US 2012/0173724 A1 Jul. 5, 2012

Related U.S. Application Data

(63) Continuation of application No. 12/604,664, filed on Oct. 23, 2009, now Pat. No. 8,276,157.

(51) Int. Cl.
*G06F 3/00* (2006.01)
*G06F 9/50* (2006.01)
*G06F 9/54* (2006.01)

(52) U.S. Cl.
CPC .............. *G06F 9/5061* (2013.01); *G06F 9/542* (2013.01)
USPC ......................................................... 719/318

(58) Field of Classification Search
CPC ........................................................ G06F 9/542
USPC ........................ 719/318; 717/120, 144, 132
See application file for complete search history.

(56) References Cited

U.S. PATENT DOCUMENTS

| 5,191,348 A | 3/1993 | Brocia et al. ................. 342/173 |
| 6,480,837 B1 | 11/2002 | Dutta ....................................... 1/1 |

(Continued)

FOREIGN PATENT DOCUMENTS

| EP | 1528498 A2 | 5/2005 | |
| EP | 1528498 A2 | 5/2005 | ............. G06F 17/60 |

(Continued)

OTHER PUBLICATIONS

Jane Cleland-Huang, Supporting Event Based Traceability through High-Level Recognition of Change Events, 2002.*
"OWL Web Ontology Language Overview," W3C, Feb. 10, 2004, 22 pages.
Notice of Allowance for U.S. Appl. No. 12/604,664 (Kache et al., "Monitoring Information Assets and Information Asset Topologies," filed Oct. 23, 2009), mailed May 21, 2012, 16 pages.

(Continued)

*Primary Examiner* — Lechi Truong
(74) *Attorney, Agent, or Firm* — VanLeeuwen & VanLeeuwen; Susan Murray

(57) ABSTRACT

According to one embodiment of the present invention, a computer system monitors information assets providing data for constructing a logical entity. The information assets are dependent upon each other for data and form a topology. The computer system receives an event message associated with an information asset. The event message includes information relating to one or more conditions of that information asset. The computer system processes the received event message to determine the presence of a change within the associated information asset that affects the topology. The change is determined based on the information relating to the one or more conditions within the received event message. The computer system further transmits a notification of the change to one or more entities in response to determining the presence of the change. Embodiments of the present invention further include a method and computer program product for monitoring information assets.

8 Claims, 9 Drawing Sheets

(56) References Cited

U.S. PATENT DOCUMENTS

| | | | |
|---|---|---|---|
| 6,611,825 B1 | 8/2003 | Billheimer et al. | 706/45 |
| 6,701,305 B1 | 3/2004 | Holt et al. | 706/45 |
| 6,836,463 B2 | 12/2004 | Garcia-Luna-Aceves et al. | 370/238 |
| 7,240,213 B1 | 7/2007 | Ritter | |
| 7,263,607 B2 | 8/2007 | Ingerman et al. | |
| 7,272,719 B2 | 9/2007 | Bleckmann et al. | 713/176 |
| 7,480,931 B2 | 1/2009 | Weiss | 726/2 |
| 7,490,317 B1 * | 2/2009 | Hahn et al. | 717/121 |
| 7,765,520 B2 * | 7/2010 | Wagner et al. | 717/101 |
| 7,904,727 B2 | 3/2011 | Bleckmann et al. | 713/176 |
| 8,108,330 B2 | 1/2012 | Li et al. | 706/45 |
| 8,171,454 B2 * | 5/2012 | Sreedhar | 717/116 |
| 2002/0144149 A1 | 10/2002 | Hanna et al. | |
| 2003/0167308 A1 | 9/2003 | Schran | 709/205 |
| 2004/0128544 A1 | 7/2004 | Hondo et al. | 713/201 |
| 2005/0283468 A1 | 12/2005 | Kamvar et al. | 707/3 |
| 2006/0010425 A1 * | 1/2006 | Willadsen et al. | 717/120 |
| 2006/0168022 A1 | 7/2006 | Levin et al. | 709/206 |
| 2006/0212925 A1 | 9/2006 | Shull et al. | 726/1 |
| 2006/0212930 A1 | 9/2006 | Shull et al. | |
| 2006/0230021 A1 | 10/2006 | Diab et al. | 707/3 |
| 2006/0294151 A1 | 12/2006 | Wong et al. | 707/200 |
| 2007/0106577 A1 | 5/2007 | Kopp et al. | |
| 2007/0156514 A1 | 7/2007 | Wright et al. | 705/14.41 |
| 2007/0156604 A1 | 7/2007 | James | |
| 2007/0156621 A1 | 7/2007 | Wright et al. | 706/48 |
| 2007/0156887 A1 | 7/2007 | Wright et al. | 709/224 |
| 2007/0180495 A1 | 8/2007 | Hardjono et al. | 726/3 |
| 2008/0015916 A1 | 1/2008 | Cossey et al. | |
| 2008/0107037 A1 | 5/2008 | Forbes et al. | |
| 2008/0209543 A1 | 8/2008 | Aaron | 726/17 |
| 2008/0261701 A1 | 10/2008 | Lewin et al. | 463/43 |
| 2009/0006230 A1 | 1/2009 | Lyda et al. | 705/35 |
| 2009/0024589 A1 | 1/2009 | Sood et al. | 707/3 |
| 2009/0235334 A1 | 9/2009 | Park | 726/4 |
| 2010/0106558 A1 | 4/2010 | Li et al. | 707/3 |
| 2010/0106559 A1 | 4/2010 | Li et al. | 707/3 |
| 2010/0107244 A1 | 4/2010 | Li et al. | 709/229 |

FOREIGN PATENT DOCUMENTS

| | | | | |
|---|---|---|---|---|
| JP | 2005135071 A | 5/2005 | | G06F 17/10 |
| JP | 2005135071 A | 5/2005 | | |
| JP | 2005322089 A | 11/2005 | | G06F 17/60 |
| JP | 2005322089 A | 11/2005 | | |
| JP | 2007041835 A | 2/2007 | | |
| JP | 2007041835 A | 2/2007 | | |

OTHER PUBLICATIONS

Notice of Allowance for U.S. Appl. No. 12/257,866 (Li et al., "Configurable Trust Context Assignable to Facts and Associated Trust Metadata," filed Oct. 24, 2008), mailed Jun. 6, 2012, 15 pages.

Final Office Action for U.S. Appl. No. 12/257,866 (Li et al., "Configurable Trust Context Assignable to Facts and Associated Trust Metadata," filed Oct. 24, 2008), mailed Oct. 27, 2011, 12 pages.

Office Action for U.S. Appl. No. 12/257,878 (Li et al., "Trust Event Notification and Actions Based on Thresholds and Associated Trust Metadata Scores," filed Oct. 24, 2008), mailed Aug. 24, 2011, 11 pages.

Notice of Allowance for U.S. Appl. No. 12/257,894 (Li et al., "Generating Composite Trust Value Scores Based on Assignable Priorities, Atomic Metadata Values and Associated Composite Trust Value Scores," filed Oct. 24, 2008), mailed Sep. 26, 2011, 11 pages.

Nelson et al., "Customer Data Quality and Integration: the Foundation of Successful CRM," Strategic Analysis Report, Gartner, Inc., Nov. 26, 2001, 30 pages.

"Global Risk Management Solutions, Global Data Management Survey 2001," PriceWaterhouseCoopers, 2000-2001, 20 pages.

Laney, "Customer Data Quality: Beyond the Bucket and Broom," META Group, Oct. 29, 2002, 4 pages.

Office Action for U.S. Appl. No. 12/257,866 (Li et al., "Configurable Trust Context Assignable to Facts and Associated Trust Metadata," filed Oct. 24, 2008), mailed Apr. 28, 2011, 11 pages.

Shah et al., "Incorporation Trust in the BitTorrent Protocol," International Symposium on Performance Evaluation of Computer and Telecommunication Systems (SPECTS 2007), Jul. 16-18, 2007, 8 pages.

Parreira et al., "Computing Trusted Authority Scores in Peer-to-Peer Web Search Networks,". AIRWeb '07, May 8, 2007, 8 pages.

Stakhanova et al., "A reputation-based trust management in peer-to-peer network systems," 2004 International Workshop on Security in Parallel and Distributed Systems, 2004, 6 pages.

TrustGauge, Trustgauge.com, 2003-2009, 2 pages.

Office Action for U.S. Appl. No. 12/257,856 (Li et al., "Trust Index Framework for Providing Data and Associated Trust Metadata," filed Oct. 24, 2008), mailed Feb. 17, 2011, 16 pages.

Final Office Action for U.S. Appl. No. 12/257,878 (Li et al., "Trust Event Notification and Actions Based on Thresholds and Associated Trust Metadata Scores," filed Oct. 24, 2008), mailed Feb. 8, 2012, 12 pages.

Final Office Action for U.S. Appl. No. 12/257,856 (Li et al., "Trust Index Framework for Providing Data and Associated Trust Metadata," filed Oct. 24, 2008), mailed Aug. 2, 2011, 17 pages.

* cited by examiner

MONITORING INFORMATION ASSETS AND INFORMATION ASSET TOPOLOGIES

CROSS-REFERENCE TO RELATED APPLICATIONS

This application is a continuation of U.S. patent application Ser. No. 12/604,664, entitled "Monitoring Information Assets and Information Asset Topologies" and filed Oct. 23, 2009, the disclosure of which is incorporated herein by reference in its entirety.

BACKGROUND

1. Technical Field

The present invention embodiments relate to live monitoring of information assets for information governance, and more specifically, to determining a status of an information asset and an information asset topology, and to dynamically detecting changes in the information asset topology.

2. Discussion of the Related Art

Information assets are generally entities that provide data, and may include physical information assets and logical information assets. Physical information assets typically refer to physical machines (e.g., computer systems, etc.) that store and/or process (e.g., transform, etc.) data. These physical machines may be associated with data quality characteristics pertaining to the quality of data being provided, and operational characteristics pertaining to the underlying physical machine. Logical information assets generally refer to data entities providing data (e.g., a report, a document, an e-mail, etc.), and may be associated with data quality characteristics (since there is no physical machine for operational characteristics).

A logical information asset may receive data from various physical and/or other logical information assets. For example, a logical information asset in the form of a report may be constructed from data provided from various physical (e.g., computer systems, database systems, etc.) and/or logical (e.g., reports, documents, etc.) information assets. The data for the report may be processed for formatting or other purposes by various physical information assets prior to insertion in the report. The logical and physical information assets providing the data for the report basically form a hierarchy or topology that indicate the dependencies (or connectivity) of those information assets and the manner in which data flows from the information assets to the report.

The integrity of the resulting report is dependent on the integrity of the data received from the logical and physical information assets providing the data within the topology. When an information asset within the topology encounters a degradation of data quality, this degradation of data quality spreads to other information assets in the topology through which the data flows to the report. Accordingly, a degradation of data quality within one or more of the information assets in the topology causes the integrity of the resulting report to be degraded.

BRIEF SUMMARY

According to one embodiment of the present invention, a computer system monitors information assets providing data for constructing a logical entity. The information assets are dependent upon each other for data and form a topology. The computer system comprises at least one storage system for storing at least one computer program, and at least one processor for processing the at least one computer program. The computer system receives an event message associated with an information asset. The event message includes information relating to one or more conditions of that information asset. The computer system processes the received event message to determine the presence of a change for the associated information asset that affects the topology. The change is determined based on the information relating to the one or more conditions within the received event message. The computer system further transmits a notification of the change to one or more entities in response to determining the presence of the change. Embodiments of the present invention further include a method and computer program product for monitoring information assets providing data for constructing a logical entity in substantially the same manner described above.

The features and advantages of the present invention will become apparent upon consideration of the following detailed description of example embodiments thereof, particularly when taken in conjunction with the accompanying drawings wherein like reference numerals in the various figures are utilized to designate like components.

DETAILED DESCRIPTION

The present invention embodiments relate to live monitoring of information assets for information governance. This is accomplished by determining a status of an information asset, and by dynamically detecting changes in an information asset topology.

Initially, information assets are generally entities that provide data, and may include physical information assets and logical information assets as described above. Physical information assets typically refer to physical machines (e.g., computer systems, etc.) that store and/or process (e.g., transform, etc.) data. These physical machines may be associated with data quality characteristics pertaining to the quality of data being provided, and operational characteristics pertaining to the underlying physical machine. Logical information assets generally refer to data entities providing data (e.g., a report, a document, an e-mail, etc.), and may be associated with data quality characteristics (since there is no physical machine for operational characteristics). A logical information asset may be produced by data received from various physical and/or other logical information assets. The logical and physical information assets providing the data basically form a hierarchy or topology that indicate the dependencies (or connectivity) of the information assets and the manner in which data flows through the information assets.

Figure 1:
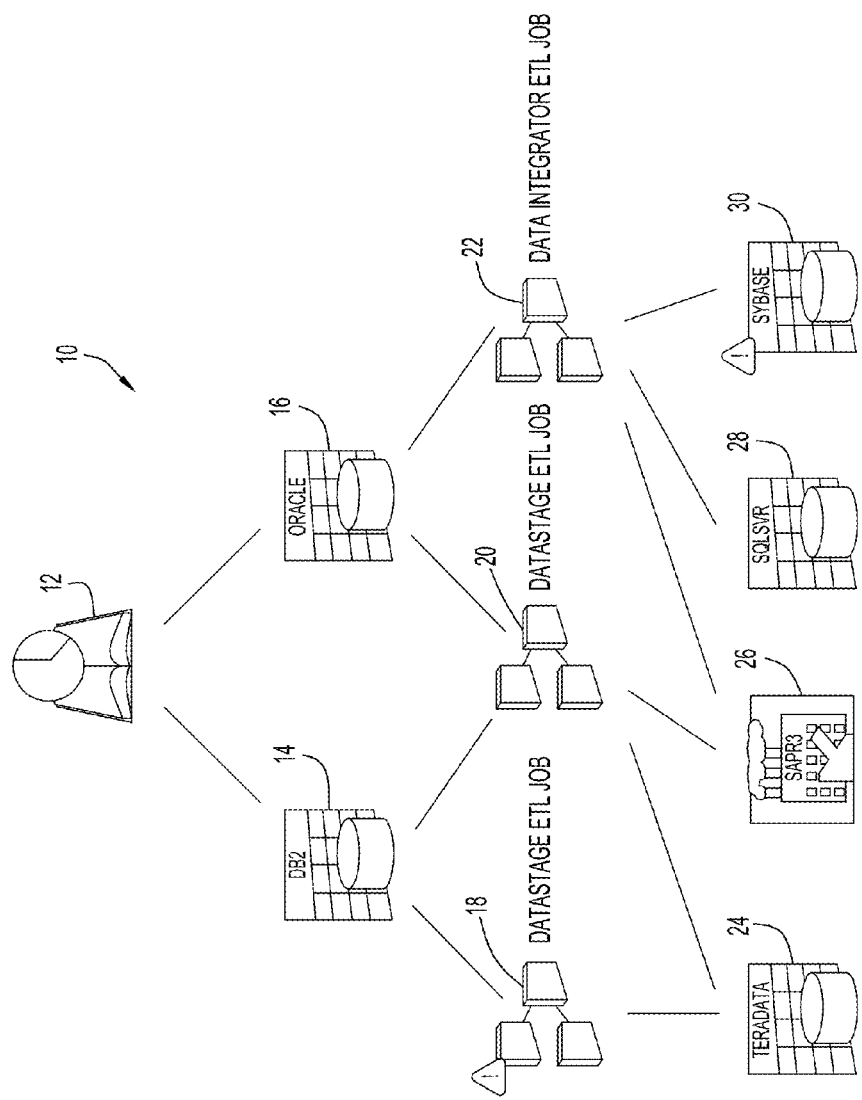
FIG. 1 is an example information asset topology that may be employed by a present invention embodiment.

An example information asset topology for a report is illustrated in FIG. 1. Specifically, topology 10 includes logical and physical information assets providing data to construct a logical information asset in the from of a report 12. The report is based on data from information assets in the form of databases 14 (e.g., a DB2 type database) and 16 (e.g., an ORACLE type database). Database 14 receives data from information assets each in the form of a Datastage Extract/Transform/Load (ETL) job 18, 20. Similarly, information assets in the form of Datastage Extract/Transform/Load (ETL) job 20 and Data Integrator Extract/Transform/Load (ETL) job 22 provide data to database 16.

Datastage Extract/Transform/Load (ETL) jobs 18, 20 and Data Integrator Extract/Transform/Load (ETL) job 22 each process data (e.g., transform the data to a desired form, standardize the data, etc.) received from other information assets, and provide the processed data to databases 14, 16. In particular, an information asset in the form of database 24 (e.g., a TERADATA type database) provides data to Datastage Extract/Transform/Load (ETL) jobs 18, 20, while an information asset in the form of a software system 26 (e.g., SAP system) provides data to Datastage Extract/Transform/Load (ETL) job 20 and Data Integrator Extract/Transform/Load (ETL) job 22. In addition, information assets in the form of a SQL server 28 and a database 30 (e.g., a SYBASE type database) each provide data to Data Integrator Extract/Transform/Load (ETL) job 22. Thus, topology 10 indicates the hierarchy or data dependencies of each of the logical and physical information assets providing data utilized to construct report 12. In other words, the topology indicates for each information asset providing data for the report the one or more other information assets providing data to that particular asset, and/or the one or more other assets receiving data from that particular asset.

The data quality and trustworthiness of report 12 depends on the status of all the information assets (physical and logical information assets) in topology 10. When an information asset within topology 10 encounters an adverse operational or data quality condition, the quality of data provided from that information asset has been degraded. This degradation of data quality spreads to other information assets in the topology through which the data flows to the report. Accordingly, an adverse operational or data quality condition causing low quality data within one or more of the information assets in topology 10 causes the integrity of resulting report 12 to be degraded.

By way of example only, Datastage Extract/Transform/Load (ETL) job 18 and database 30 (e.g., a SYBASE type database) each encounter an adverse operational or data quality condition (e.g., as indicated by the triangular symbol in FIG. 1), thereby providing data of low quality. In the case of Datastage Extract/Transform/Load (ETL) job 18, the low quality data is provided from Datastage Extract/Transform/Load (ETL) job 18 to database 14, thereby potentially corrupting data provided from database 14 to report 12 and degrading the integrity of the report.

Similarly, low quality data is provided from database 30 (e.g., a SYBASE type database) to Data Integrator Extract/Transform/Load (ETL) job 22. The low quality data potentially corrupts data provided from the Data Integrator Extract/Transform/Load (ETL) job, thereby further potentially corrupting data provided from database 16 to report 12 and degrading the integrity of the report.

Accordingly, embodiments of the present invention provide real-time monitoring of status for information assets, and for an information asset topology. The status for an information asset is determined by monitoring conditions for that asset (e.g., all conditions associated with the asset, user enabled conditions for the asset based on a given topology, etc.). The monitored conditions include operational and data quality characteristics. Thus, the status for a logical information asset (e.g., report 12) may be based on both the operational and data quality characteristics of the physical information assets in the information asset topology (e.g., topology 10).

The status for an information asset topology is determined by an aggregated status of the information assets in the topology. Notifications may be sent to users or applications to indicate that a change in status has occurred for an information asset or an information asset topology.

In addition, a present invention embodiment dynamically detects changes in the information asset topology, and informs users and applications of these changes (e.g., asset and/or relationship additions and deletions). This provides users and/or applications with insight into an information asset change in the enterprise, and enables appropriate actions to be performed.

Figure 2:
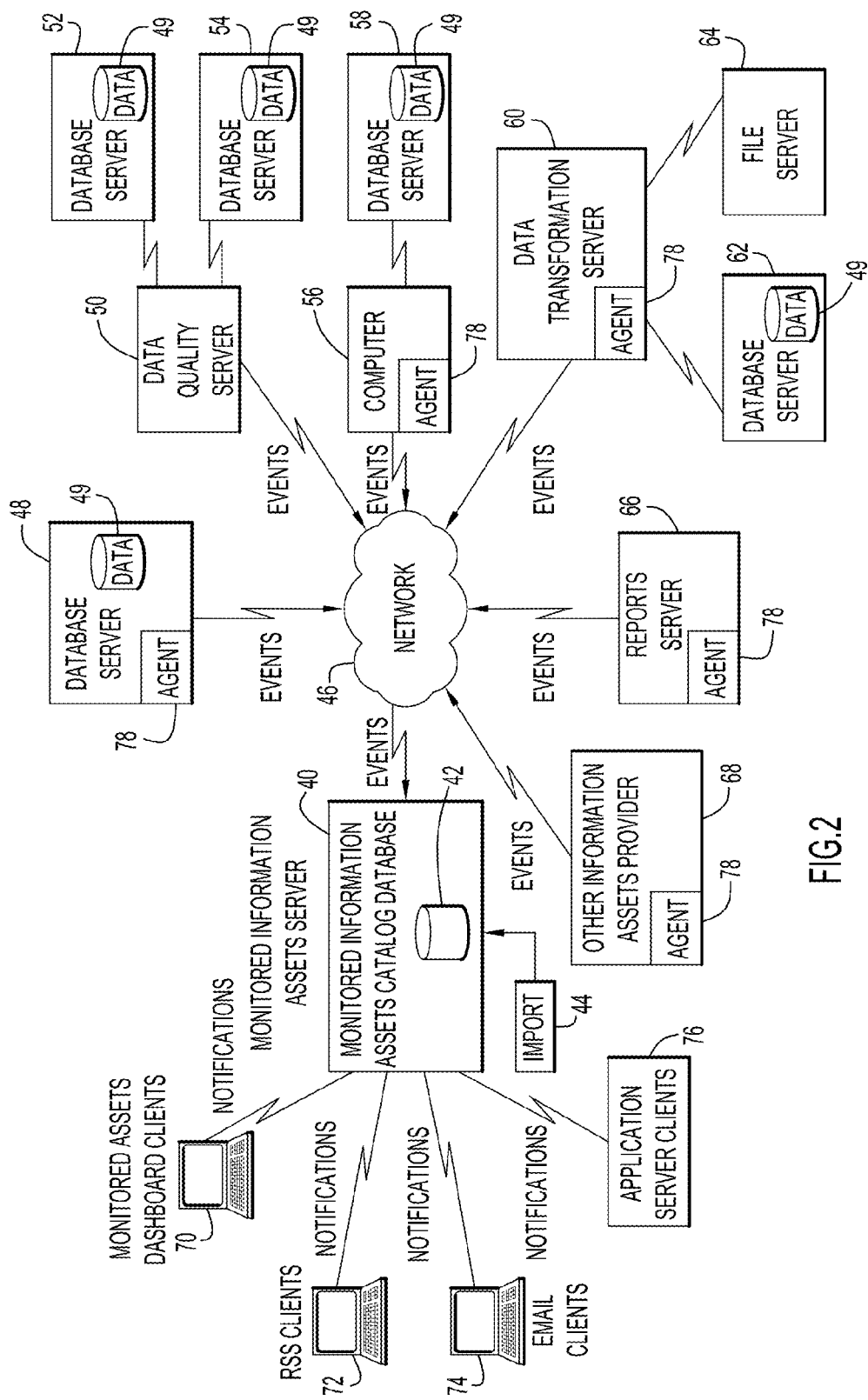
FIG. 2 is diagrammatic illustration of an example network environment for use with a present invention embodiment.

An example network environment for a present invention embodiment is illustrated in FIG. 2. Specifically, the environment includes a monitored information assets server 40, a database server 48, a data quality server 50, a computer system 56, a data transformation server 60, a reports server 66, and one or more information assets providers 68. These components are coupled via a network 46, and may be implemented by any conventional or other computer systems preferably equipped with a display or monitor, a base (e.g., including the processor, memories and/or internal or external communications devices (e.g., modem, network cards, etc.)) and optional input devices (e.g., a keyboard, mouse or other input device). Network 46 may be implemented by any quantity of any suitable communications media (e.g., WAN, LAN, Internet, Intranet, etc.).

Reports server 66 accesses one or more data providing servers or computer systems to retrieve data to perform the analysis necessary to produce a report (or other logical information asset). Reports server 66 includes a corresponding agent module 78 that sends event messages to monitored information assets server 40 pertaining to the report and related information. Reports server 66 may retrieve information from various information assets or sources within an information asset topology (e.g., as described above for FIG. 1) in order to generate reports (or other logical information assets (e.g., documents, etc.)). By way of example, reports server 66 may produce logical information asset or report 12 in the topology described above for FIG. 1.

Monitored information assets server 40 receives and processes event messages including information pertaining to information assets. Event messages are received from other computer systems over network 46 as described below, and include a payload of information that indicate occurrence of certain conditions pertaining to information assets (e.g., addition and/or removal of an information asset (results in the addition and/or removal of an asset from the corresponding information asset topology), addition and/or removal of an information asset relationship (results in the addition and/or removal of a relationship amongst information assets that form the asset topology), information asset operational status and/or conditions, information asset data quality metrics, etc.). Monitored information assets server 40 includes a monitored information assets catalog database 42 that stores entries for information assets that may be monitored, and records relationships amongst information assets within an information asset topology. In addition, monitored information assets server 40 includes or is associated with an import module 44. The import module imports an XML or other suitable file (e.g., via a command-line or other user interface) including a specification of information asset entries and any relationships amongst those information assets to enable this information to be stored in monitored information assets catalog database 42. In other words, import module 44 enables importation of information asset topology specifications into the monitored information assets catalog database.

The monitored information assets server further includes one or more applications (e.g., a Web Application accessible by a client browser) to enable a user to view and monitor information asset status, information asset topology status, and event messages. The monitored information assets server provides this information to one or more client computer systems 70 each including a browser to enable a user to view and monitor information assets status, information asset topology status, and event messages. Client devices 70 display a graphical user interface or dashboard (FIG. 6) for interaction with the user. The information assets and corresponding topologies are preferably monitored by monitored information assets server 40 on a subscription basis. Accordingly, monitored information assets server 40 enables users to subscribe and indicate (e.g., via the graphical user interface) the particular information assets and/or topologies with which the users desire to be affiliated.

In addition, the monitored information assets server provides notifications to subscribed clients to indicate information asset activities (e.g., information asset status changes, information asset topology status changes, information topology changes, any certain event message types, etc.). For example, monitored information assets server 40 may provide notifications (e.g., directly or over network 46 or other network) to one or more RSS clients 72 each in the form of a computer system with an RSS client to monitor notifications. Further, the monitored information assets server may provide notifications (e.g., directly or over network 46 or other network) to one or more electronic mail (E-mail) clients 74 each in the form of a computer system with an electronic mail (E-mail) client to receive electronic mail notifications. In addition, the monitored information assets server may provide notifications (e.g., directly or over network 46 or other network) to one or more application server clients 76 each preferably in the form of a computer system executing application server software hosting applications that listen (e.g., via Application Programming Interfaces (API)) for notifications (e.g., via the Java Messaging Service (JMS) protocol).

Monitored information assets server 40 may receive event messages from various sources (e.g., database server 48, data quality server 50, computer system 56, data transformation server 60, reports server 66, and other information assets providers 66) over network 46 to monitor an information asset topology. For example, database server 48 may include one or more databases 49 containing data for reports server 66. The database server includes a corresponding agent module 78 that collects and sends database operational and/or actual data content event messages over network 46 to monitored information assets server 40. By way of example, database server 48 may correspond to one or more of information assets 14, 16, 24, 26, 28, 30 of the information asset topology described above for FIG. 1.

Data quality server 50 may be associated with database servers 52, 54 each including one or more databases 49 containing data for reports server 66. Data quality server 50 performs data analytics and data profiling against multiple data sources and types (e.g., database servers 52, 54), and produces data quality metrics. The resulting data quality metrics are sent over network 46 to monitored information assets server 40 in the form of event messages. By way of example, database servers 52, 54 may correspond to one or more of information assets 14, 16, 24, 26, 28, 30 of the information asset topology described above for FIG. 1, while data quality server 50 may function similar to an agent module 78.

Computer system 56 includes a corresponding agent module 78 that retrieves operational and/or actual data content information from a remote database server 58 including one or more databases 49 containing data for reports server 66. Agent module 78 sends event messages pertaining to computer system 56, database server 58, and the information handled by database server 58 over network 46 to monitored information assets server 40. By way of example, computer system 56 (and database server 58) may correspond to one or more of information assets 14, 16, 18, 20, 22, 24, 26, 28, 30 of the information asset topology described above for FIG. 1.

Data transformation server 60 performs Extract-Transform-Load (ETL) tasks against data located at a database server 62 and a file server 64. Database server 62 includes one or more databases 49 containing data for reports server 66, while file server 64 includes one or more files containing data for reports server 66. Data transformation server 60 includes a corresponding agent module that sends ETL task execution results in the form of event messages over network 46 to monitored information assets server 40. By way of example, data transformation server 60 may correspond to one or more of information assets 18, 20, 22 of the information asset topology described above for FIG. 1.

Information assets providers 68 may be implemented by any suitable computer system including an information asset with information for reports server 66. The information assets providers each include a corresponding agent module 78 to send operational, data quality and other data content type information about the information assets in the form of event messages over network 46 to monitored information assets server 40. By way of example, information assets providers 68 may correspond to one or more of information assets 14, 16, 24, 26, 28, 30 of the information asset topology described above for FIG. 1.

The information assets and information assets providers may be implemented by any suitable data storing structure and/or corresponding data storing unit (e.g., documents, reports, files, databases, database servers, computer systems (e.g., general processing, servers, clients, etc.), file server and systems, memory devices, etc.).

A present invention embodiment provides real-time monitoring of status for information assets and a corresponding information asset topology, dynamically detects changes in the information asset topology, and informs users and applications of topology and status changes. This provides users and/or applications with insight into an information asset change in the enterprise, and enables appropriate actions to be performed as described above. An aspect of the present invention embodiment is to leverage real-time monitoring capabilities to provide notifications for changes in the actual information asset topologies/dependencies that dynamically surface in an information asset enterprise in real-time. The monitored information assets server depends on real-time information for information asset and relationship changes received from various agent modules in the form of event messages. When a topology undergoes changes, notifications to subscribed users or applications are initiated to provide notice about the changes.

Figure 6:
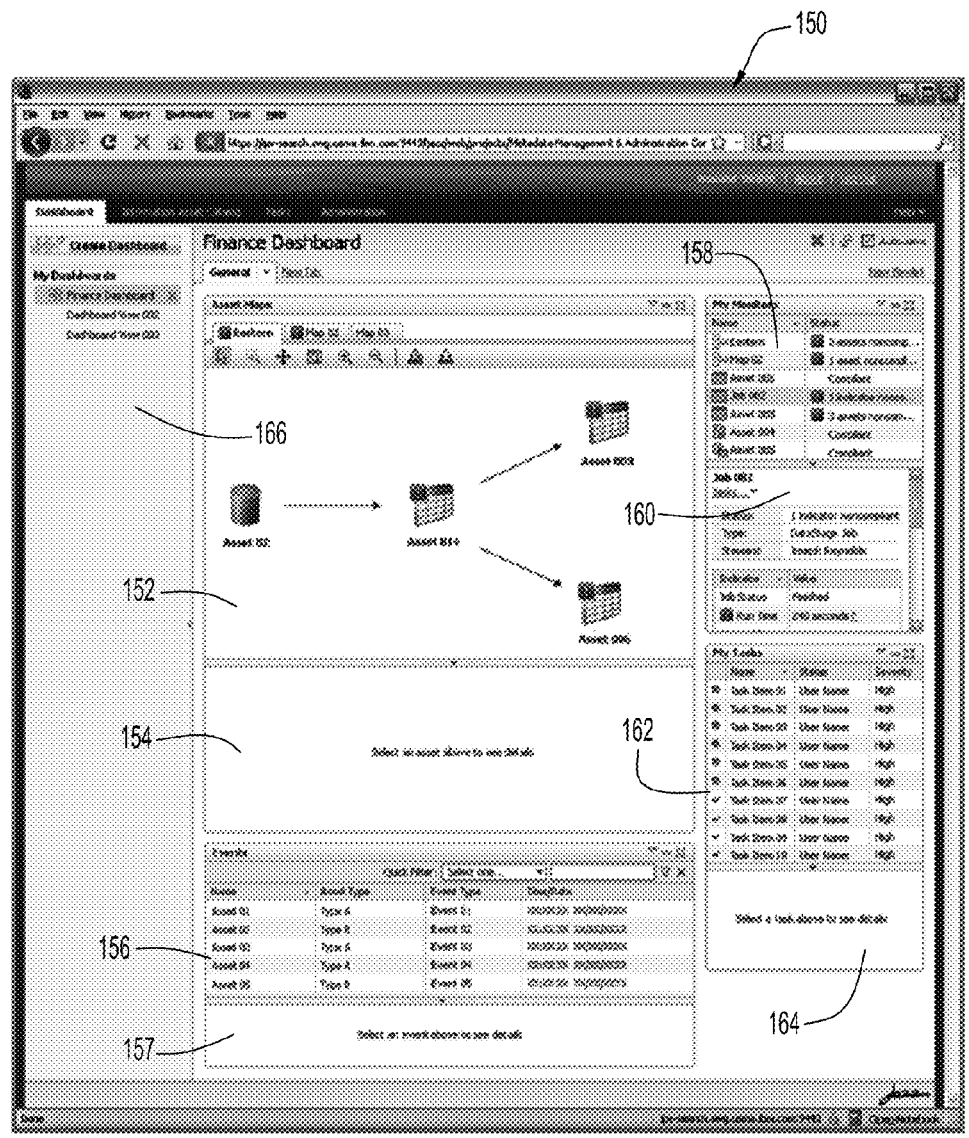
FIG. 6 is a schematic illustration of a graphical user interface for information asset monitoring according to an embodiment of the present invention.

A change to an information asset topology may occur in various manners. For example, a user can manipulate an information asset topology (e.g., adding and/or removing relationships, etc.) manually via a user interface described below (FIG. 6). Further, import module 44 (FIG. 2) may import an XML or other file that contains relationship additions and/or removals. In addition, event messages may be received indicating a topology change. In this case, monitored information assets server 40 (FIG. 2) receives event messages including information pertaining to information assets, and processes those received event messages to dynamically detect a change in the information asset topology. Monitored information assets server 40 includes various software and/or hardware modules to detect the topology changes (e.g., from the interface, imported file, and event messages) and to incorporate the topology changes into monitored information assets catalog database 42.

In addition, agent modules 78 (FIG. 2) (or other software and/or hardware modules on remote computer systems on network 46) are providing continuous event messages (e.g., addition and/or removal of information assets and relationships) to monitored information assets server 40. The manner in which relationships (e.g., addition and/or removal of an asset, addition and/or removal of an asset relationship, etc.) are being determined by the agent modules, or being provided by another software solution are dependent on the purpose of the particular software on that remote computer system.

Agent modules 78 preferably transmit event messages in response to determination of information for the monitored conditions, and changes to the information asset topology (e.g., determining an added or removed relationship or dependency for the associated information asset from the conditions or properties of the information asset). The agent modules typically periodically poll the corresponding computer system, device, or software (of an information asset) to ascertain measurements of or otherwise determine information relating to operational and/or data quality conditions, and properties of the information asset (e.g., dependencies, relationships, etc.). The information relating to the monitored conditions is typically provided in the form of a score (numeric) value, while the score values and/or topology change information are inserted into an event message for transmission to monitored information assets server 40. Agent modules 78 may examine log files generated by the computer system, device and/or software, and/or utilize APIs to communicate with software to ascertain the conditions, and/or to determine topology related changes. By way of example, agent modules 78 may include a database agent module that provides information for conditions relating to databases, a transformation agent module that provides information for conditions relating to data transformations or other processing, and a detection agent module that examines a host system to determine the presence of information assets (e.g., databases, applications, etc.). However, any suitable types or quantity of agent modules may be employed that provide information relating to any suitable conditions or properties.

Alternatively, the agent module may be embedded or built-in an application or computer system. In this case, a user may enable real-time monitoring of conditions, where event messages are generated and transmitted in response to an analysis initiated by the user. The user may further control the analysis by specifying various rules (e.g., rules for sources, etc.). The agent module pushes data during the analysis for transmission to monitored information assets server 40.

Figure 3:
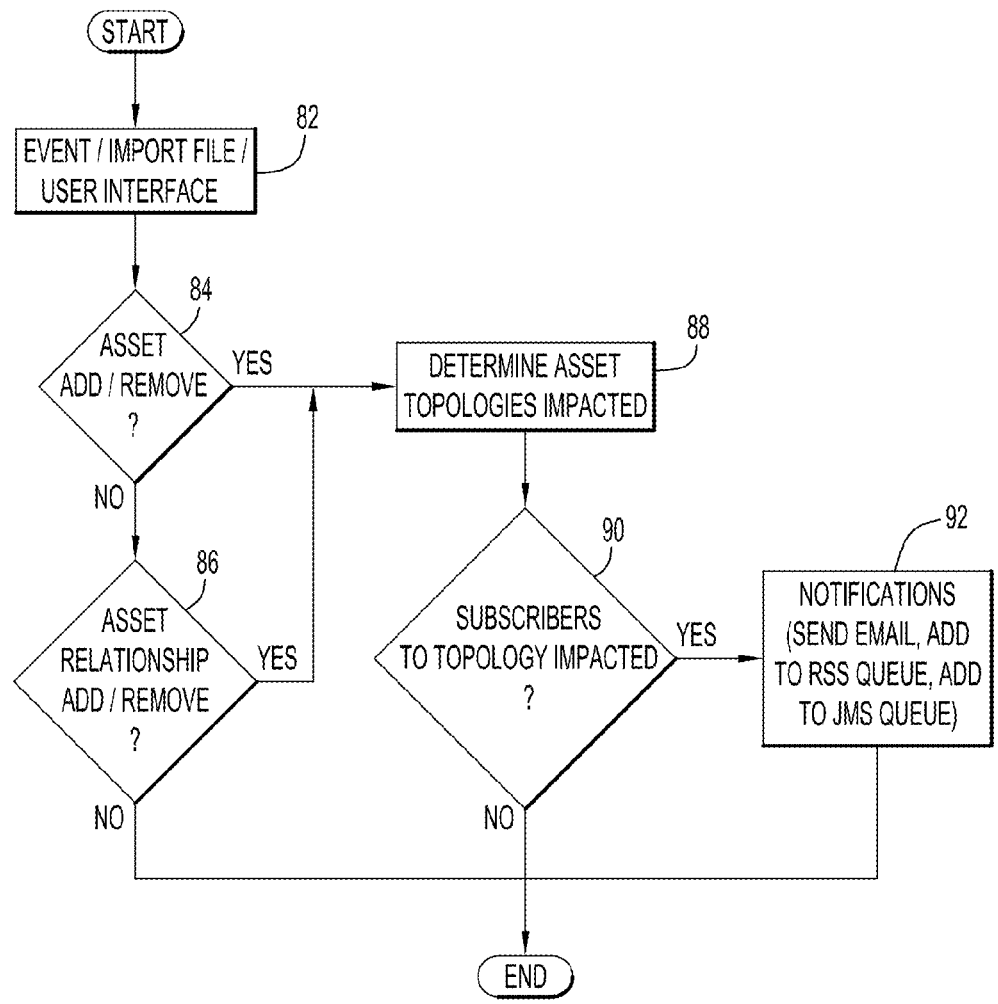
FIG. 3 is a procedural flowchart illustrating the manner in which a change in an information asset topology is detected according to an embodiment of the present invention.

The manner in which monitored information assets server 40 dynamically detects a change in the information asset topology is illustrated in FIG. 3. In particular, monitored information assets server 40 detects one of an importation of a file, a manipulation of an information asset topology via the user interface, and reception of an event message at step 82. Monitored information assets server 40 may receive event messages, by way of example, from data quality server 50 (FIG. 2) and/or various agent modules 78 with each event message providing information pertaining to the associated information asset (e.g., database servers 48, 52, 54, 58, 62, computer system 56, data transformation server 60, file server 64, reports server 66, and other information assets providers 68, etc.).

The monitored information assets server 40 determines the presence of the addition and/or removal of an information asset from the information asset topology at step 84. In the case of the user interface, this can be derived based on the actions performed by the user (e.g., insertion or removal of an information asset from the information asset topology) via the interface or Web application. With respect to the file importation, a topology change may be derived from the contents of the imported file specifying the topology (e.g., a comparison of the topology specified by the imported file with the previous topology structure). In addition, an event message may contain information indicating a topology change.

When an event message has been received, monitored information assets server 40 examines the information contained in the event message to determine the presence of an addition and/or removal of an information asset. In particular, an event message provided to monitored information assets server 40 preferably includes a defined format. The event message includes a number of properties or fields, wherein the fields are mandatory and/or optional based on the type and subtype of the event message. For example, an event message may include the following fields:

eventType—a registered event message type that includes "Property" and "Relationship";

eventSubtype—values including "ADD" and "DROP" to indicate desired actions;

eventTime—a timestamp determined by an agent module to indicate the time an event message was created, wherein the time is preferably in the form of Greenwich Mean Time (GMT);

eventLang—a two character language identifier for descriptive data in the event message (e.g., en (English), fr (French), jp (Japanese)), wherein English is the default value;

eventDesc—descriptive text about the event message in the language specified by the eventLang field for intended display by the user interface (e.g., as a high level description of an incoming event message);

eventSource—descriptive text about the source of the event message in the language specified by the eventLang field (e.g., this is preferably a user friendly name of the agent module intended to be user visible informational detail on an event message, and may be a combination of the computer system that hosts the agent module and the type of agent module, such as "InformationAnalyzer Machine Address/URL");

eventGroupID—a temporary identifier used to group multiple incoming event messages into a single logical event, wherein this is a mechanism for grouping a set of events together that occurred logically as a single logical event. This enables a user examining a single event message in the user interface to see the set of event messages that came in with the current event message. The agent module may leave this blank or set a value indicating transmission of multiple change event messages as a logical group. The value should be unique within the event message type, or event messages delivered by a given agent module may be identified by the agentUniqueID field described below. For example, the value may be set to a monotonically increasing number (e.g., each time the agent module initiates and sends a group of event messages, a counter is incremented and sets the same value for all the event messages in that group);

agentUniqueID—a unique Identifier for the agent module delivering the event message, and is preferably a globally unique identifier (GUID) or other identifier that uniquely identifies the agent module proxy in the asset store or computer system storing the information asset (e.g., this value is typically retrieved from a configuration file);

assetID—a unique identifier assigned to an information asset by monitored information assets server 40, and is used for an exact match (e.g., may be a globally unique identifier (GUID));

assetName—a name of the asset for intended display on the user interface as part of event message details;

assetType—indicates the type of information asset;

assetNativeID—a unique identifier native to the information asset outside of the monitored information assets server. When this identifier is supplied, the identifier is used to match an event message with a registered information asset within the asset store. If this identifier is absent, a match is attempted based on the values of incoming properties within an event message (e.g., an event message indicating that properties are being identified);

assetIdentifierXML—an optional XML or other payload that supplies the names and values of properties of the information asset which are defined as identifiers. These properties are used to match an existing information asset in the asset store when the assetNativeID field is not specified. The XML is preferably formatted as a simple element, where the element name is the property name, and the element value is the value of the property. This XML should include the full set of properties and values which uniquely identify the asset. An example payload may be:

```
<assetIdentifierXML>
    <![CDATA[
    <DB_TYPE>DB2</DB_TYPE>
    <DB_HOST>RESTONQA11.xxx.xxx..com</DB_HOST>
    <DB_NAME>FEDLC</DB_NAME>
    <SCHEMA_NAME>ADMINISTRATOR</SCHEMA_NAME>
    <NAME>NEW_TABLE2</NAME>
    ]]>
</assetIdentifierXML>;
``` assetXML—an optional XML or other payload that supplies the names and values of properties of the information asset which are not identifiers. An example payload may be:

```
<assetXML>
    <![CDATA[
    <SchemaChanges>MM/DD/YYYY HH:MMpm
    dbo.FOO_TABLE.MyColumn
    Added</SchemaChanges>
        <Owner>dbo</Owner>
    ]]>
</assetXML>; and
```

Metric Fields—one or more (e.g., and may be on the order of one-hundred) event message type specific metric properties that are typically numeric and represent a score value.

Event message views share the same set of fixed properties described above along with a variable set of event message type specific properties. For example, an event message may further include the following fields for relationships (e.g., the eventType field indicates a Relationship):

relatedAssetID—an identifier (e.g., substantially similar to the assetID field described above) that identifies the related information asset;

relatedAssetName—specifies the name (e.g., substantially similar to the assetName field described above) of the related information asset;

relatedAssetType—indicates the type of the related information asset;

relatedAssetNativeID—an identifier (e.g., substantially similar to the AssetNativeID field described above) that identifies the related information asset;

relatedAssetIdentifierXML—indicates properties of the related information asset that are identifiers (e.g., substantially similar to the assetIdentifierXML field described above);

relatedAssetXML—indicates properties of the related information asset that are not identifiers (e.g., substantially similar to the AssetIdentifierXML field described above);

relationshipType—a registered relationship type (e.g., a dependency, etc.);

relationshipLabel—a user friendly name for the relationship in the language specified by the eventLang field; and relationshipXML—additional field reserved for various uses.

Event message types (e.g., eventType field) typically include Property (e.g., indicating that the event message includes information pertaining to an addition or removal of an information asset) and Relationship (e.g., indicating that the event message includes information pertaining to a relationship between information assets), where the subtypes (e.g., eventSubtype field) for each of these types include Add and Drop. Accordingly, an event message indicating the addition of an information asset includes, by way of example, fields with the following values:

```
eventType=Property;
eventSubtype=Add;
eventTime="Month Day, Year HH:MM:SS AM GMT";
eventLang="en";
eventDesc="Adding Information Asset Database: CUST_TRANS";
eventSource=" InformationAnalyzer agent on ADDRESS/URL";
agentUniqueID=7777;
eventAssetIdentifierXML=<contains mandatory property values that uniquely identify the new information asset to be added>.
```

Similarly, an event message indicating the removal of an information asset includes, by way of example, fields with the following values:

```
eventType=Property;
eventSubtype=Drop;
eventTime="Month Day, Year HH:MM:SS AM GMT";
eventLang="en";
eventDesc="Removing Information Asset Database: CUST_TRANS";
eventSource=" InformationAnalyzer agent on ADDRESS/URL";
agentUniqueID=7777;
eventAssetIdentifierXML=<contains mandatory property values that uniquely identify the information asset to be removed>.
```

The monitored information assets server examines the type and subtype fields (e.g., eventType and eventSubtype) of a received event message to determine the presence of an addition and/or removal of an information asset from the information asset topology.

When no addition or removal of an information asset is present, monitored information assets server 40 determines the presence of an addition and/or removal of a relationship (e.g., a connection or link between information assets) within the information asset topology at step 86. A change in the information asset topology (e.g., addition and/or removal of an information asset relationship) may be created in various manners as described above. In the case of the user interface, this can be derived based on the actions performed by the user (e.g., altering the connectivity within the topology, insertion or removal of an information asset or relationship from the information asset topology, etc.) via the interface or Web application. With respect to the file importation, a relationship change may be derived from the contents of the imported file specifying the topology (e.g., a comparison of the topology specified by the imported file with the previous topology structure). In addition, an event message may contain information indicating a relationship change.

When an event message has been received, monitored information assets server 40 examines the information contained in the event message to determine the presence of an addition and/or removal of a relationship within the information asset topology. An event message provided to monitored information assets server 40 preferably includes a defined format as described above. Accordingly, an event message indicating the addition of a relationship between information assets may include, by way of example, fields with the following values:

---
eventType=Relationship;
eventSubtype=Add;
eventTime="Month Day, Year HH:MM:SS AM GMT";
eventLang="en";
eventDesc="Adding Information Asset Relationship between Database: CUST_TRANS and Report: Customer Payments";
eventSource=" InformationAnalyzer agent on ADDRESS/URL";
agentUniqueID=7777;
eventAssetIdentifierXML=<contains mandatory property values that uniquely identify one information asset in the relationship>;
eventRelatedAssetIdentifierXML=<contains mandatory property values that uniquely identify the other information asset in the relationship>.

---

Similarly, an event message indicating the removal of a relationship between information assets may include, by way of example, fields with the following values:

---
eventType=Relationship;
eventSubtype=Drop;
eventTime="Month Day, year HH:MM:SS AM GMT";
eventLang="en";
eventDesc="Removing Information Asset Relationship between Database: CUST_TRANS and Report: Customer Payments";
eventSource=" InformationAnalyzer agent on ADDRESS/URL";
agentUniqueID=7777;
eventAssetIdentifierXML=<contains mandatory property values that uniquely identify one information asset in the relationship>;
eventRelatedAssetIdentifierXML=<contains mandatory property values that uniquely identify the other information asset in the relationship>.

---

The monitored assets server examines the type and subtype fields (e.g., eventType and eventSubtype) of a received event message to determine the presence of an addition and/or removal of a relationship between information assets in the information asset topology.

Once monitored information assets server 40 determines the presence of an addition and/or removal of an information asset (e.g., step 84) or of a relationship between information assets (e.g., step 86) (e.g., based on the user interface, file importation, and/or received event messages as described above), the monitored information assets server identifies the existing topologies in monitored assets catalog database 42 (FIG. 2) that are impacted by the topology change (e.g., addition and/or removal of an information asset or relationship) at step 88, and incorporates the change for the identified topologies into that database. In the case of a topology change being initiated from the user interface or imported file, monitored information assets server 40 receives information from the user interface or imported file, and stores the topology change in monitored assets catalog database 42.

With respect to a topology change received in an event message, the monitored information assets server processes the received event message to determine and store the topology change in monitored assets catalog database 42. For example, with respect to event messages with types of Property or Relationship, monitored information assets server 40 interprets the event message subtype field, and if the event message subtype field is set to "ADD" and the assetXML or relatedAssetXML fields include property value pairs (e.g., an old property value and a new property value), the monitored information assets server attempts to match the incoming event message with information assets (e.g., via the various identifiers and/or properties indicated in the event message described above), and replace the current values of existing matching properties with the corresponding new property values in the event message. If matching property values are not found, the corresponding new property values from the event message are added to the information asset. When the event message subtype field is set to "ADD" (e.g., with event message types of Property or Relationship, and a new property value in the assetXML field without property value pairs) and a matching property is found, monitored information assets server 40 creates and adds a new property with the same name and the new property value to the information asset. In this way, the property becomes multivalued. The property values within the event message may effectively add an information asset or relationship to the topology.

When the event message subtype field is set to "DROP" (e.g., with event message types of Property or Relationship) and there are property values in the assetXML field, monitored information assets server 40 removes the property with the matching value from the information asset. This in effect allows removal of an individual entry (e.g., from a multivalued field). In addition, when the event message subtype field is set to "DROP" and there are no properties defined in the assetXML field, monitored information asset server 40 removes the entire information asset (e.g., when the event message eventType field is set to Property) or relationship between information assets (e.g., when the event message eventType field is set to Relationship).

Information assets and corresponding topologies are preferably monitored on a subscription basis. Accordingly, monitored information assets server 40 enables users to subscribe to and indicate (e.g., via the user interface described below) the particular information assets and/or topologies with which the users desire to be affiliated as described above. Once the impacted topologies have been identified (e.g., step 88), monitored information assets server 40 identifies each subscriber associated with each identified topology (e.g., each topology impacted by the change) at step 90, and sends a change notification to each of the identified subscribers indicating the change at step 92. The notification may be provided to subscribers in various manners. For example, monitored information assets server 40 may provide notifications to subscribers (e.g., directly or over network 46 or other network) via an RSS feed (e.g., place a notification on an RSS queue, etc.), electronic mail (E-mail), and/or applications that listen (e.g., via APIs) for notifications (e.g., via the Java Messaging Service (JMS) protocol by adding the notification to a JMS queue). The notifications typically include information indicating the topology, the added or removed asset, the relationship, and the information assets associated with the relationship based on the type of actions occurring. However, the notifications may include any desired information, may be of any suitable format, and may be sent via any conventional or other data communication techniques (e.g., e-mail, RSS, JMS, fax, pager, cellular telephone text or message, etc.).

An embodiment of the present invention further determines the status for an information asset by monitoring conditions for that asset. An aspect of the present invention embodiment includes enabling users and applications to establish and understand a status for an information asset representing a logical entity (e.g., a report, etc.) based on a combination of operational and data quality conditions. The present invention embodiment represents both physical and logical information assets and their dependency relationships, while determining and representing an information asset status based on data quality and operational conditions of other information assets from which the information asset depends. The monitored information assets server depends on real-time information for information assets received from the agent modules in the form of event messages. The agent modules (or other software on remote computer systems on network 46) are providing continuous event messages (e.g., condition information in the form of score values, etc.) to monitored information assets server 40 in substantially the same manner described above. These event messages each include a payload of operational status conditions and/or data quality metrics (e.g., score values, etc.) for a corresponding information asset. The event message may be associated with a physical information asset (e.g., a database, etc) and/or a logical information asset (e.g., a report, My Envelope, etc.).

Thus, the present invention embodiment combines representation of a topology of physical and logical information assets to monitor status, with processing of status for a logical information asset based on operational and data quality event messages that agent modules are providing for dependent information assets. An example of data quality event messages includes data analytics results from an execution of a data analysis tool. The metrics that result from this execution and are associated with the desired information assets are sent to the monitored information assets server to determine the status for the desired information assets based on the metrics.

Monitored information assets server 40 includes various software and/or hardware modules to receive event messages including information pertaining to information assets, and to process those received event messages to determine a status for individual information assets and the corresponding information asset topology. A status for an information asset or an information asset topology, by way of example, may be represented by various states including compliant/good, non-compliant/suspect, and undetermined. The good state indicates that no data quality nor operational issues are being detected, while the suspect state indicates that data quality and/or operational issues may have been detected and investigation should be performed. The undetermined state indicates that no event messages for data quality nor operational conditions have ever been received for the information asset (e.g., thereby providing an unknown or undetermined state).

Alternatively, the status may be represented by a more refined value, such as a status value in a particular value range (e.g., zero to one-hundred).

An information asset is associated with one or more monitored conditions each resolving to a boolean status or value (e.g., True or False, one or zero, etc.). Each monitored condition is further associated with metrics including a lower-bound value, an upper-bound value, and a current value. An event message associated with an information asset and including a score value for a monitored condition is initially received by monitored information assets server 40. The score value represents a numerical value associated with the monitored condition as described above. The score value of this initial event message is used as the initial value of the current value metric for the associated monitored condition.

The upper and lower bound metrics represent the acceptable range (from the current value metric) of a received score value for the monitored condition. When a received score value for a monitored condition is outside the acceptable range (e.g., indicated by the current, upper, and lower bound values), a status for the monitored condition is set to False, while the status is set to True in response to the received score value being within the acceptable range. An initial variance of +/−10% of the current value metric is utilized as the initial acceptable range. Since the initially received score value is always in the acceptable range (e.g., of +/−10% of that score value), the status for the monitored condition is initialized to a good state.

A user may set the lower and upper bound values via the user interface (FIG. 6). Once this occurs, the absolute range indicated by the user-specified upper and lower bound values is utilized to determine the status for the monitored condition. For example, a user may set the lower bound value to zero, thereby indicating that no score value less than the current or base value metric is within the acceptable range to provide a boolean status of True for the monitored condition. Further, the user may set the upper bound value to zero, thereby indicating that no score value greater than the current or base value metric is within the acceptable range to provide a boolean status of True for the monitored condition. Moreover, the user may set both the upper and lower bound values to zero, where a score value must equal the base or current value metric to be within the acceptable range to provide a boolean status of True for the monitored condition. In addition, the user may reset the current value for a monitored condition via the user interface. This enables the current value to be set via event messages, or by the user in order to override score values received in the event messages (e.g., from an agent module).

An information asset may be associated with numerous monitored conditions. However, in the context of a topology, a user may only be interested in a portion of those conditions which pertain to, or are relevant for, the topology. Thus, the user may want the status of an information asset to be based on certain conditions for a particular situation or topology. Accordingly, the user may enable (and/or disable) conditions for an information asset via the user interface. An embodiment of the present invention may determine the status for an information asset outside the context of a topology (e.g., based on all associated conditions), and within the context of a topology (e.g., based on the relevant or enabled conditions).

Figure 4A:
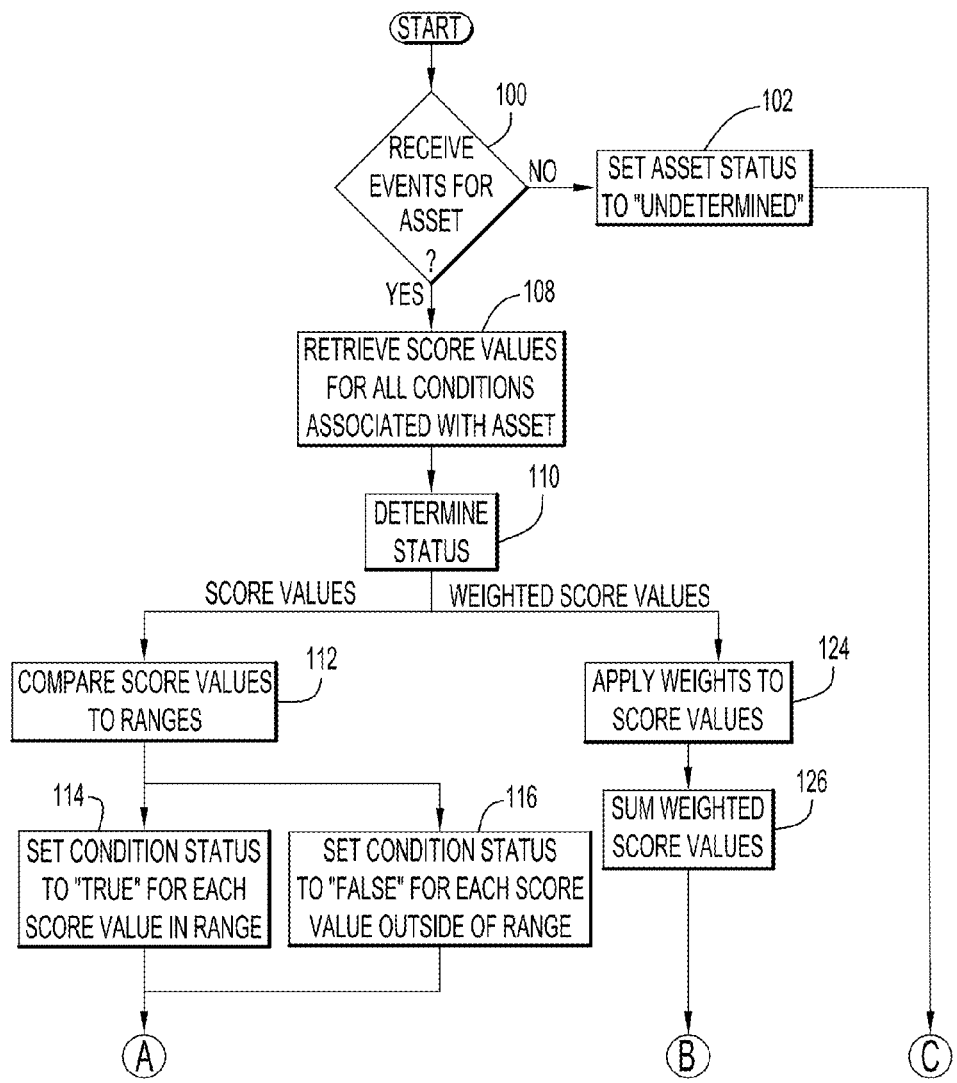
FIGS. 4A-4B are a procedural flowchart illustrating the manner in which a status of an information asset is determined outside the context of a topology according to an embodiment of the present invention.
Figure 4B:
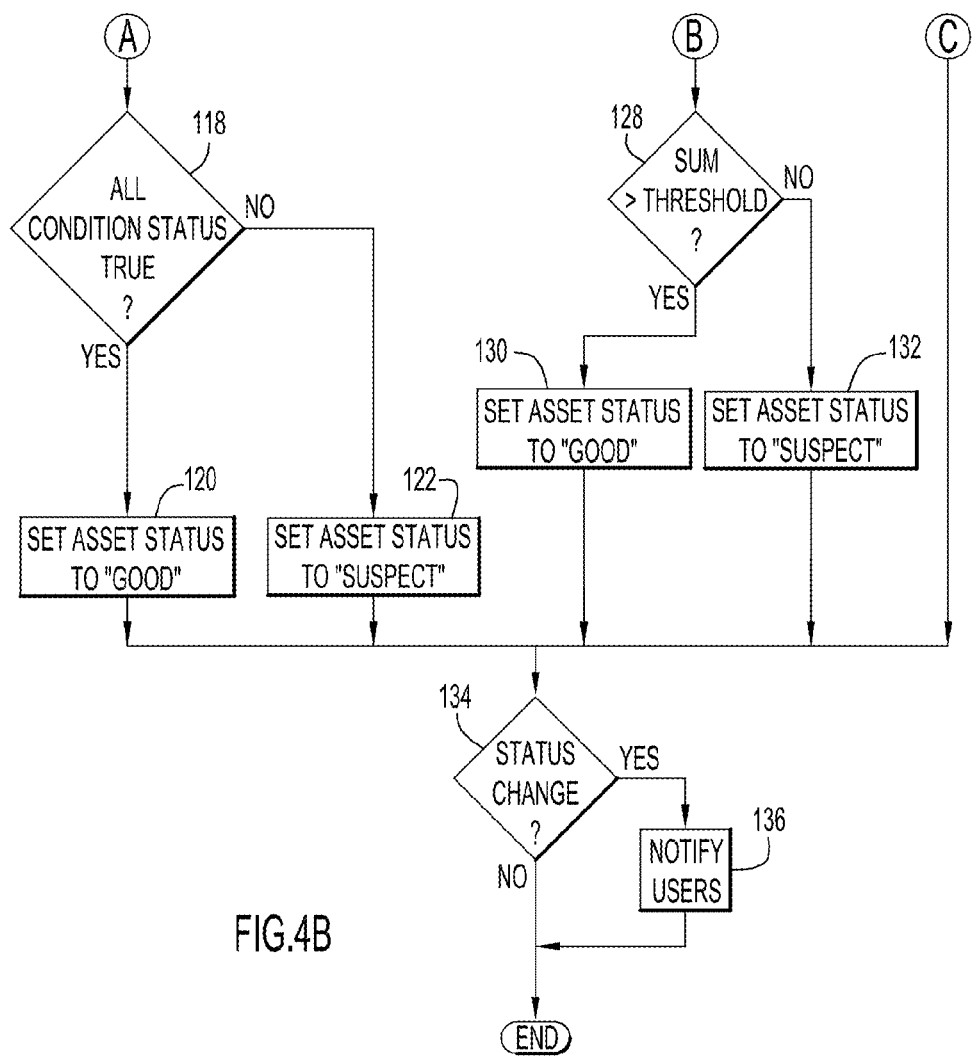

The manner in which monitored information assets server 40 determines a status for individual information assets outside the context of a topology is illustrated in FIGS. 4A-4B. Specifically, monitored information assets server 40 determines receipt of event messages associated with information assets (e.g., from corresponding agent modules or other monitoring units) at step 100. If no event messages are received for an information asset, the status of that information asset is set to an undetermined state at step 102. However, when monitored information assets server 40 receives event messages, each event message includes one or more score values for corresponding monitored conditions of an associated information asset. For example, monitored information assets server 40 may receive event messages from data quality server 50 (FIG. 2) and/or various agent modules 78 with each event message providing information pertaining to the associated information asset (e.g., database servers 48, 52, 54, 58, 62, computer system 56, data transformation server 60, file server 64, reports server 66, other information assets providers 68, etc.).

A monitored condition may relate to the operational condition of an information asset or data quality of data provided by an information asset. Various metrics may be associated with the operational and data quality conditions to produce a score value for the corresponding monitored condition that is inserted into an event message for transmission to monitored information assets server 40. The operational condition metrics may be provided by corresponding agent modules, or by various conventional or other diagnostic type tools, and may include: the monitored information asset (e.g., a computer system or other device) being in an operational state; a percentage of memory capacity utilized by the monitored information asset; etc. The data quality metrics may be provided by corresponding agent modules, or by various conventional or other data analysis tools, and may include: a percentage of data that did not meet one or more rules; a mean number of rules not met per record; a mean percentage of rules not met per record; a standard deviation of the number of rules not met per record; a standard deviation of the percentage of rules not met per record; a percentage of validity variance; a number of validity variance; a percentage of confidence variance; a number of confidence variance; a percentage of confidence of rules not met; a confidence of the maximum records allowed over the limit; a confidence of the actual records over the limit; number passed; percent passed; number failed; percent failed; baseline variance; etc.

Monitored information assets server 40 retrieves score values from the received event message for all monitored conditions of the associated information asset at step 108, and determines the status for the information asset based on the retrieved score values at step 110. In particular, monitored information assets server 40 compares the retrieved score value for each monitored condition to the corresponding acceptable range for that monitored condition at step 112. If the score value for a monitored condition is within the corresponding acceptable range, the boolean status for that monitored condition is set to True at step 114. Otherwise, the boolean status for that monitored condition is set to false at step 116.

Monitored information assets server 40 examines the boolean status of each of the monitored conditions for an information asset at step 118, and sets the asset status to a good state at step 120 in response to each monitored condition for the information asset attaining a boolean status of True. If one or more of the monitored conditions attains a boolean status of False, the status for the asset is set to a suspect state at step 122.

The status of an individual information asset outside the context of a topology may alternatively be determined based on a weighting of the monitored conditions. The weighting permits users to control the influence of factors affecting trustworthiness of the data from an information asset. For example, occurrence of a monitored asset condition of lesser weight may indicate the resulting data from that asset is suspect, but the trustworthiness of the resulting data may still be acceptable. In the case of weighted score values, each of the monitored conditions is associated with a weighting factor that is applied to the corresponding score value for that condition at step 124. Alternatively, a weighting scale may be utilized by an agent module in producing the score value for that condition received within an event message. The weighted score values for the monitored conditions of the information asset are summed to produce a sum asset score at step 126. The status of the information asset is determined by comparing the sum asset score against an asset score threshold. If the sum asset score exceeds the asset score threshold as determined at step 128, the status for the information asset is set to a good state at step 130. Otherwise, the status for the information asset is set to a suspect state at step 132.

Information assets and corresponding topologies are preferably monitored on a subscription basis as described above. Accordingly, monitored information assets server 40 enables users to subscribe to and indicate (e.g., via the user interface described below) the particular information assets and/or topologies with which the users desire to be affiliated as described above. Once a status for the asset is determined, monitored information assets server 40 determines the presence of a change of status for the information asset. If the status of the information asset has changed as determined at step 134, monitored information assets server 40 identifies each subscriber associated with the information asset and sends a change notification to the subscribers indicating the change of status at step 136. The notification may be provided to subscribers in various manners. For example, monitored information assets server 40 may provide notifications to subscribers (e.g., directly or over network 46 or other network) via an RSS feed (e.g., place a notification on an RSS queue, etc.), electronic mail (E-mail), and/or applications that listen (e.g., via APIs) for notifications (e.g., via the Java Messaging Service (JMS) protocol by adding the notification to a JMS queue). The notifications typically include information indicating the change in status (e.g., old and new status, etc.). However, the notifications may include any desired information, may be of any suitable format, and may be sent via any conventional or other data communication techniques (e.g., e-mail, RSS, JMS, fax, pager, cellular telephone text or message, etc.).

Figure 4C:
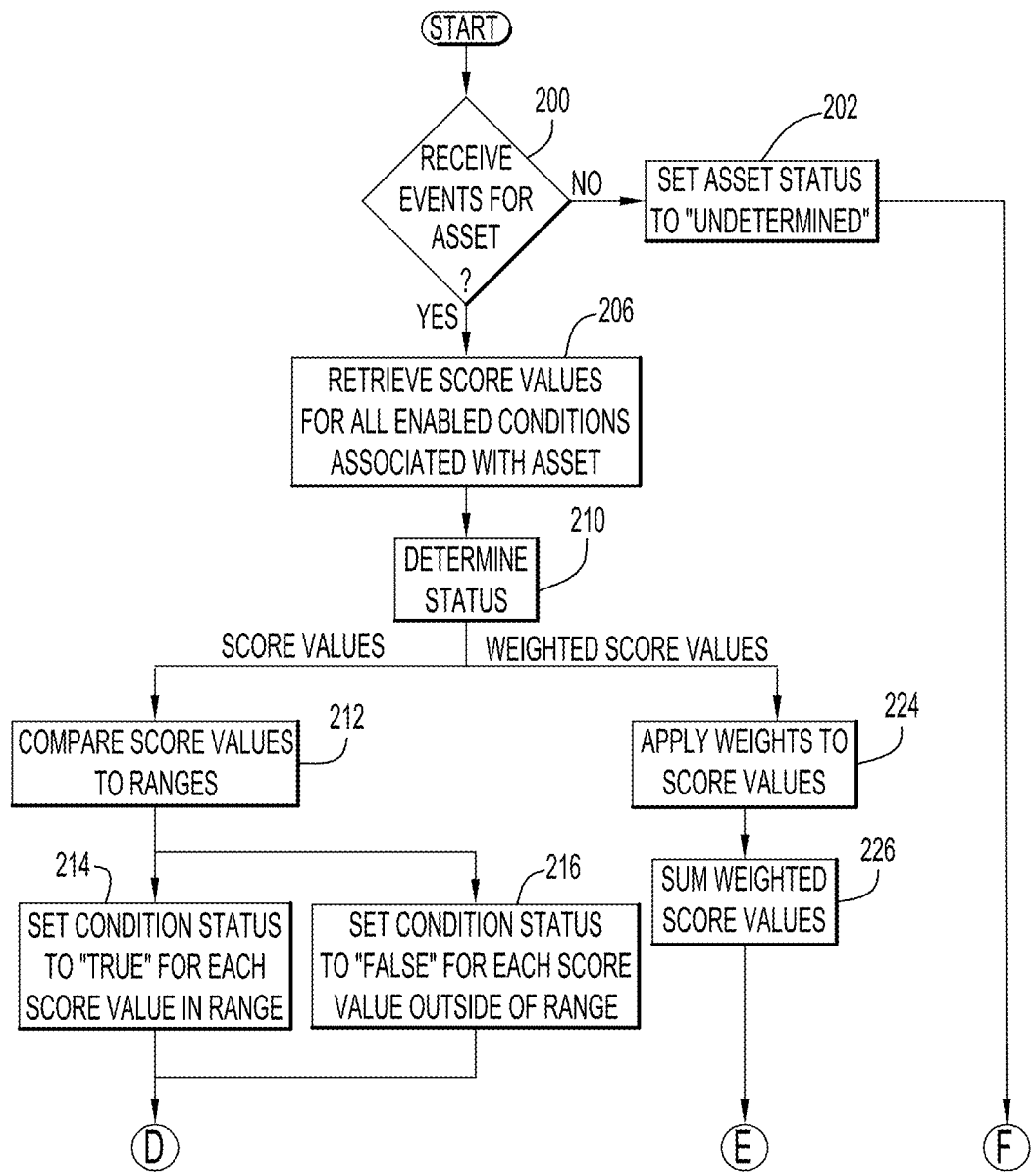
FIGS. 4C-4D are a procedural flowchart illustrating the manner in which a status of an information asset is determined within the context of a topology according to an embodiment of the present invention.
Figure 4D:
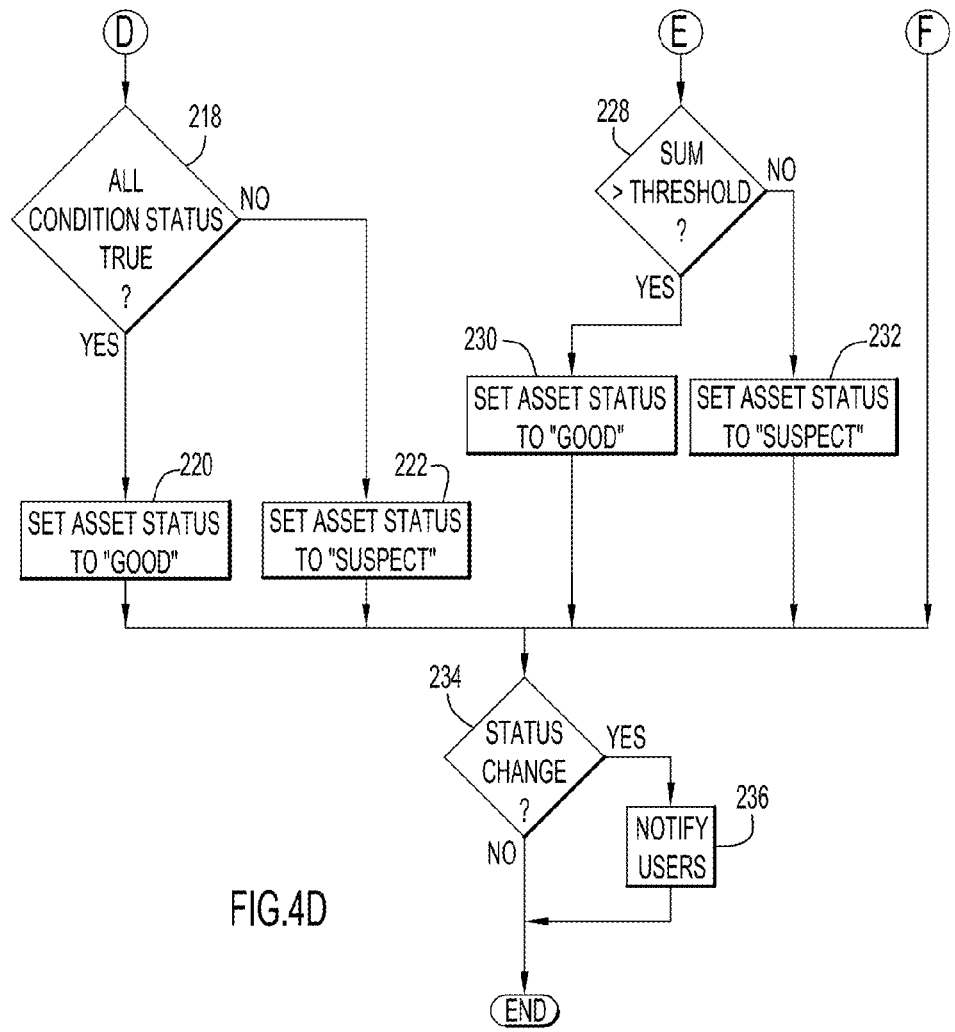

The monitored information assets server further determines the status for individual information assets within the context of a topology as illustrated in FIGS. 4C-4D. Initially, the status for information assets within the context of a topology is determined based on monitored conditions a user has enabled for the information asset in the context of that topology as described above. Specifically, monitored information assets server 40 determines receipt of event messages associated with information assets (e.g., from corresponding agent modules or other monitoring units) at step 200. If no event messages are received for an information asset, the status of that information asset is set to an undetermined state at step 202. However, when monitored information assets server 40 receives event messages, each event message includes one or more score values for corresponding monitored conditions of an associated information asset. For example, monitored information assets server 40 may receive event messages from data quality server 50 (FIG. 2) and/or various agent modules 78 with each event message providing information pertaining to the associated information asset (e.g., database servers 48, 52, 54, 58, 62, computer system 56, data transformation server 60, file server 64, reports server 66, and other information assets providers 68, etc.).

An enabled monitored condition may relate to the operational condition of an information asset or data quality of data provided by an information asset. Various metrics may be associated with the operational and data quality conditions to produce a score value for the corresponding enabled monitored condition that is inserted into an event message for transmission to monitored information assets server 40. The operational condition and data quality metrics may be provided by corresponding agent modules, or by various conventional or other diagnostic type tools, and may be substantially similar to those described above.

Monitored information assets server 40 retrieves a score value from the received event message for each enabled monitored condition of the associated information asset at step 206, and determines the status for the information asset based on the retrieved score values at step 210. In particular, monitored information assets server 40 compares the retrieved score value for each enabled monitored condition to the corresponding acceptable range for that monitored condition at step 212. If the score value for an enabled monitored condition is within the corresponding acceptable range, the boolean status for that enabled monitored condition is set to True at step 214. Otherwise, the boolean status for that enabled monitored condition is set to false at step 216.

Monitored information assets server 40 examines the boolean status of each of the enabled monitored conditions for an information asset at step 218, and sets the asset status to a good state at step 220 in response to each enabled monitored condition for the information asset attaining a boolean status of True. If one or more of the enabled monitored conditions attains a boolean status of False, the status for the asset is set to a suspect state at step 222.

The status of an individual information asset within the context of a topology may alternatively be determined based on a weighting of the enabled monitored conditions. The weighting permits users to control the influence of factors affecting trustworthiness of the data from an information asset. For example, occurrence of an enabled monitored condition of lesser weight may indicate the resulting data is suspect, but the trustworthiness of the resulting data may still be acceptable. In the case of weighted score values, each of the enabled monitored conditions is associated with a weighting factor that is applied to the corresponding score value for that condition at step 224. Alternatively, a weighting scale may be utilized by an agent module in producing the score value for that condition received within an event message. The weighted score values for the enabled monitored conditions of the information asset are summed to produce a sum asset score at step 226. The status of the information asset is determined by comparing the sum asset score against an asset score threshold. If the sum asset score exceeds the asset score threshold as determined at step 228, the status for the information asset is set to a good state at step 230. Otherwise, the status for the information asset is set to a suspect state at step 232.

Information assets and corresponding topologies are preferably monitored on a subscription basis as described above. Once a status for the asset is determined, monitored information assets server 40 determines the presence of a change of status for the information asset. If the status of the information asset has changed as determined at step 234, monitored information assets server 40 identifies each subscriber associated with the information asset and sends a change notification to the subscribers indicating the change of status at step 236. The notification may be provided to subscribers in various manners. For example, monitored information assets server 40 may provide notifications to subscribers (e.g., directly or over network 46 or other network) via an RSS feed (e.g., place a notification on an RSS queue, etc.), electronic mail (E-mail), and/or applications that listen (e.g., via APIs) for notifications (e.g., via the Java Messaging Service (JMS) protocol by adding the notification to a JMS queue). The notifications typically include information indicating the change in status (e.g., old and new status, etc.). However, the notifications may include any desired information, may be of any suitable format, and may be sent via any conventional or other data communication techniques (e.g., e-mail, RSS, JMS, fax, pager, cellular telephone text or message, etc.)

Figure 5:
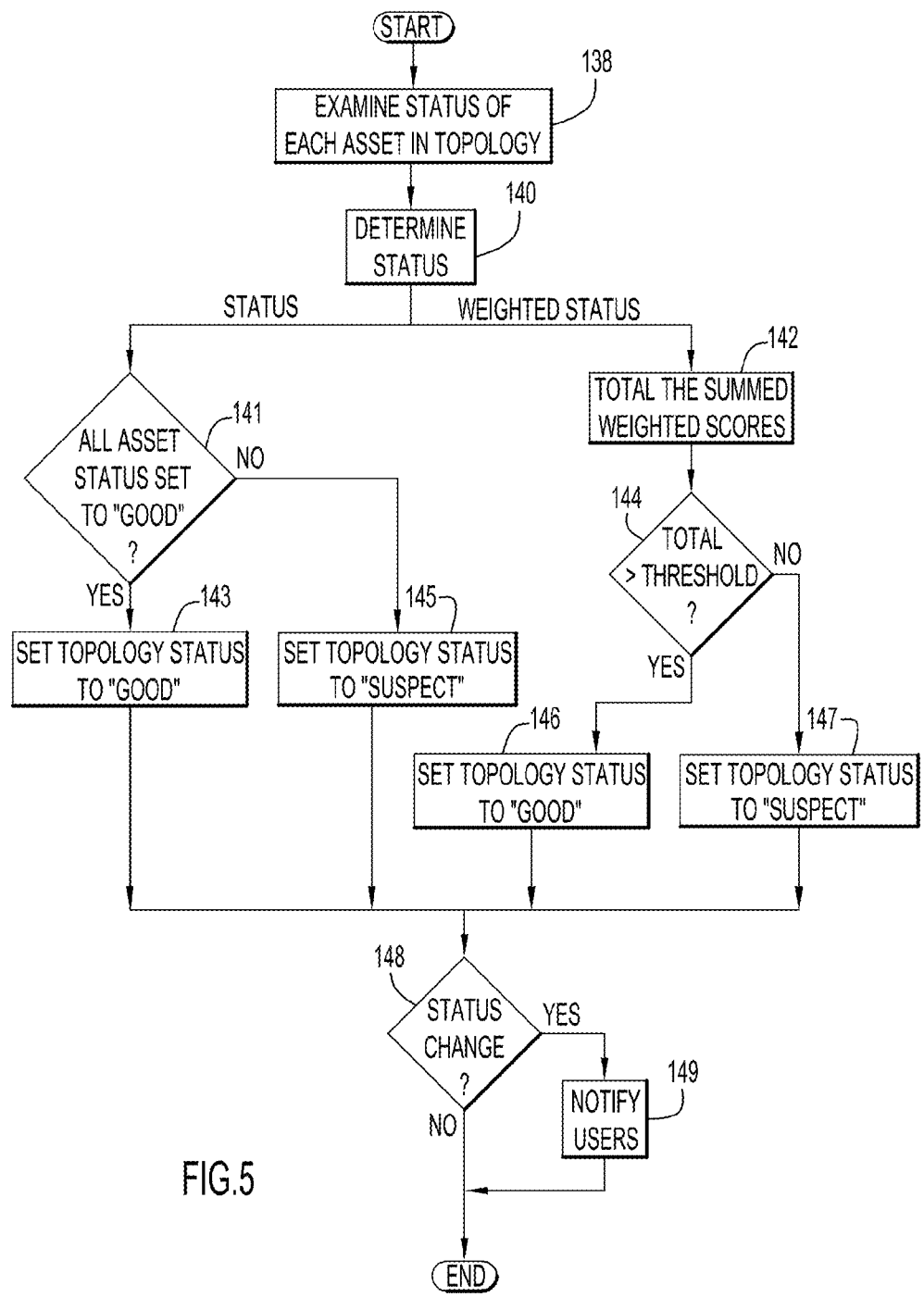
FIG. 5 is a procedural flowchart illustrating the manner in which a status of an information asset topology is determined according to an embodiment of the present invention.

Once the status for information assets within an information asset topology have been determined, monitored information assets server 40 determines a status for the information asset topology as illustrated in FIG. 5. Specifically, monitored information assets server 40 examines the status of each information asset in the information asset topology at step 138, and determines the status of the topology at step 140. In particular, when the status of each information asset in the topology is in a good state as determined at step 141, monitored information assets server 40 sets the topology status to a good state at step 143. If one or more of the information assets within the topology have a suspect status, the status for the topology is set to a suspect state at step 145.

The status of an information asset topology may alternatively be determined based on the weighted scores for the information assets. The weighting permits users to control the influence of factors affecting trustworthiness of the data from an information asset as described above. In the case of weighted score values, the status of the information asset topology may be determined based on the sum asset scores of the information assets within the information asset topology. In particular, the monitored information assets server sums the asset scores for the information assets to produce a total asset score at step 142. The status of the information asset topology is determined by the monitored information assets server comparing the total asset score against a topology threshold. If the total asset score exceeds the topology threshold as determined at step 144, the status for the information asset topology is set to a good state at step 146. Otherwise, the status for the information asset topology is set to a suspect state at step 147.

Information assets and corresponding topologies are preferably monitored on a subscription basis as described above. Once a status for the topology is determined, monitored information assets server 40 determines the presence of a change of status for the topology. If the status of the topology has changed as determined at step 148, monitored information assets server 40 identifies each subscriber associated with the topology and sends a change notification to the subscribers indicating the change of status at step 149. The notification may be provided to subscribers in various manners. For example, monitored information assets server 40 may provide notifications to subscribers (e.g., directly or over network 46 or other network) via an RSS feed (e.g., place a notification on an RSS queue, etc.), electronic mail (E-mail), and/or applications that listen (e.g., via APIs) for notifications (e.g., via the Java Messaging Service (JMS) protocol by adding the notification to a JMS queue). The notifications typically include information indicating the change in status (e.g., old and new status, etc.). However, the notifications may include any desired information, may be of any suitable format, and may be sent via any conventional or other data communication techniques (e.g., e-mail, RSS, JMS, fax, pager, cellular telephone text or message, etc.).

In addition, the status for an information asset or the information asset topology may be determined by utilizing status rules providing logic based on relationship types between information assets.

An example graphical user interface for information asset monitoring according to an embodiment of the present invention is illustrated in FIG. 6. Initially, interface 150 may be provided by monitored information assets server 40 and displayed by a browser on a client device. The interface provides various information to a user, enables the user to create, subscribe to and/or modify topologies, subscribe to information assets, and specify (or subscribe to) desired monitored conditions for an information asset. Specifically, interface 150 includes a map area 152, an asset detail area 154, an event area 156, an event detail area 157, a user monitor area 158, a monitor detail area 160, a task area 162, a task detail area 164, and an interface area 166. Map area 152 generally displays an information asset topology. The topology is displayed utilizing various icons or symbols representing an information asset (e.g., storage container or grid as viewed in FIG. 6) and a compliance indication (e.g., exclamation point as viewed in FIG. 6 indicating a problematic information asset). Any suitable symbols, icons or other indicators may be utilized to represent the information assets and compliance indicators. The topology is displayed in map area 152 preferably in diagrammatic form (e.g., symbols or icons representing the various information assets interconnected by arrows as viewed in FIG. 6), and is manipulable by a user (e.g., via a mouse or other input devices) for modification of the topology structure, information assets, and relationships between those assets.

A user may select an information asset displayed in map area 152 (e.g., via a mouse or other input device), where details of the selected information asset are displayed in asset detail area 154 positioned below map area 152. In addition, a user may select and enable conditions for the selected asset, and specify the various thresholds, upper and lower bounds, current values, and weighting factors for the conditions (e.g., via a mouse or other input device). The user may further subscribe to the selected asset (or a topology), and enter various information, including destinations for notifications (e.g., via a mouse or other input device). Event area 156 is disposed below asset detail area 154, and displays information (e.g., event message name, asset type, event message type, time/date, etc.) relating to various event messages pertaining to the information assets. A particular event message may be retrieved based on a search or filter. A user may select an event message displayed in event area 156 (e.g., via a mouse or other input device), where details of the selected event message are displayed in event detail area 157 positioned below event area 156.

User monitor area 158 is disposed adjacent an upper portion of map area 152 and displays information (e.g., name of information asset or topology, status, etc.) of various information assets or topologies being monitored by a user. A user may select an item displayed in user monitor area 158 (e.g., via a mouse or other input device), where details of the selected item are displayed in monitor detail area 160 positioned below user monitor area 158. For example, if Job 002 is selected from user monitor area 158 (e.g., as viewed in FIG. 6), monitor detail area 160 provides information (e.g., status, type, administrator, job indicator, job indicator value, etc.) pertaining to that selected job. By way of example, jobs may include ETL or other jobs on physical information assets.

Task area 162 is disposed below monitor detail area 160, and includes information (e.g., task name, task status, task priority or severity, etc.) pertaining to tasks monitored by the user. A user may select a task displayed in task area 162 (e.g., via a mouse or other input device), where details of the selected task are displayed in task detail area 164 positioned below task area 162. Tasks are generally activities assigned to the user accessing the user interface. For example, when an information asset attains a suspect status and needs to be investigated, the user is typically responsible for the investigation and utilizes their task list (e.g., in task area 162) to provide the investigations needed to be performed. In addition, the user may change the status of a task (e.g., within task area 162 and/or task detail area 164 via a mouse or other input device). For example, the user may accept the task (e.g., if someone created the task and assigned it to the user), create a new task (e.g., for the user or another user), complete the task, close the task, etc.

Interface area 166 is disposed between a side edge of screen 150 and map area 152. Interface area 166 maintains interface views created by the user for various topologies and/or information assets. The views may be selected by the user (e.g., via a mouse or other input device) for display.

It will be appreciated that the embodiments described above and illustrated in the drawings represent only a few of the many ways of implementing embodiments for monitoring information assets and information asset topologies.

The environment of the present invention embodiments may include any quantity of computer or other processing systems (e.g., database, application or other server systems, client systems, databases, general processing devices, etc.) in the form of logical and/or physical information assets, and arranged in any desired fashion. The computer or other processing systems employed by the present invention embodiments may be implemented by any quantity of any personal or other type of computer or processing system (e.g., IBM-compatible, Apple, Macintosh, laptop, palm pilot, etc.), and may include any commercially available operating system (e.g., Windows, OS/2, Unix, Linux, etc.) and any commercially available or custom software (e.g., browser software, communications software, server software, agent module, import module, modules of the monitored information assets server (e.g., handling status and topology changes and providing the user interface), etc.). These systems may include any types of monitors and input devices (e.g., keyboard, mouse, voice recognition, etc.) to enter and/or view information.

It is to be understood that the software (e.g., agent module, import module, modules of the monitored information assets server (e.g., handling status and topology changes and providing the user interface), etc.) for the computer systems of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry. The various functions of the computer systems may be distributed in any manner among any quantity of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various client and server systems. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a recorded medium (e.g., magnetic or optical mediums, magneto-optic mediums, floppy diskettes, CD-ROM, DVD, memory devices, etc.) for use on standalone systems or systems connected by a network or other communications medium.

The communication network may be implemented by any quantity of any type of communications network (e.g., LAN, WAN, Internet, Intranet, VPN, etc.). The computer systems of the present invention embodiments (e.g., client systems, database, application or other server systems, etc.) may include any conventional or other communications devices to communicate over the network via any conventional or other protocols. The computer systems (e.g., client system, database, application or other server system, etc.) may utilize any type of connection (e.g., wired, wireless, etc.) for access to the network.

The databases may be implemented by any conventional or other databases, data stores or storage structures (e.g., files, databases, data structures, etc.). The databases may be remote from or local to each other, the client systems and/or the server systems.

The present invention embodiments may be utilized for any information asset topology including any quantity or type of logical and/or physical information assets. The information asset topology may have any suitable structure including any quantity of hierarchy levels or tiers, where the information assets may include any types of dependencies or other relationships. The information assets may provide any suitable data for constructing any type of logical information asset (e.g., document, report, etc.). The physical information assets may perform any desired processing on the data (e.g., transformations, formatting, standardization, etc.).

The agent module may be located on any suitable computer or processing system remote or local to an information asset to monitor conditions. The agent module may monitor any quantity of any types of conditions associated with an information asset (e.g., operational, data quality, various metrics, etc.). The agent module may provide monitoring results in any suitable form (e.g., score or other value, etc.), where the results may be weighted or otherwise processed (e.g., normalized, different formats, different scales or scaling, etc.). The score value may be of any suitable types or values (e.g., boolean, numeric, states, alphanumeric, any continuous domain or range of any types of values (e.g., zero to one-hundred, 'A' to 'Z', etc.), etc.), and may be associated with any suitable range. The agent module may monitor and/or provide event messages at any desired time intervals. Alternatively, the agent module may be embedded within or part of another module or tool (e.g., an analysis module), and provide event messages as data is gathered during an analysis or other function of that other module or tool.

An event message may include any quantity of any types of fields, and be arranged in any suitable fashion. The fields may each include any information of any suitable type (e.g., metrics, conditions, topology information, properties, etc.). The event message may utilize any desired information or be arranged in any fashion to indicate any type of topology change (e.g., addition, removal or update of an information asset or relationship, etc.).

The import module may import any suitable file or other structure containing a topology specification. The file may include any desired information, and be arranged in any suitable format.

The determination of a topology change or status may be performed at any suitable time intervals (e.g., periodically, as event messages are received, etc.). The notifications may include any desired information (e.g., topology, status, etc.), may be of any suitable format, and may be sent via any conventional or other data communication techniques (e.g., e-mail, RSS, JMS, fax, pager, cellular telephone text or message, etc.).

The status for an information asset or topology may include any quantity of any types of states or values (e.g., good, suspect, undetermined, any intermediate levels between those states, numeric, alphanumeric, any continuous domain or range of any types of values (e.g., zero to one-hundred, 'A' to 'Z', etc.), etc.). An information asset may be associated with any quantity of any types of conditions (e.g., operational, data quality, etc.). The monitored conditions may receive a status of any suitable types or values (e.g., boolean, numeric, states, alphanumeric, any continuous domain or range of any types of values (e.g., zero to one-hundred, 'A' to 'Z', etc.), etc.), and may be associated with any suitable range. The status for a monitored condition may be determined in any manner based on the score value (e.g., comparisons, arithmetic or other computation, weighting, statistics, logic, etc.). The lower and upper bounds may be of any suitable values (e.g., numeric, alphanumeric, etc.) to define any desired acceptable range. The conditions may include any desired weighting factors, where the weighting factors may be applied in any suitable fashion. The various thresholds may be set to any desired values to control the status of the asset or topology.

The status of the monitored conditions (e.g., boolean or other states, weighted or other score values, domain or range values, etc.) may be combined in any suitable fashion to determine a status for the asset (e.g., logically, arithmetically, weighting, normalization, scaling, statistically, etc.). The status of the information assets (e.g., states, weighted or other score values, domain or range values, etc.) may be combined in any suitable fashion to determine a status for the topology (e.g., logically, arithmetically, weighting, normalization, scaling, statistically, etc.). The status for an asset (outside or within the context of a topology) may be determined based on any quantity of any monitored conditions. These conditions may be specified in any manner (e.g., user-specified, predetermined, etc.). The conditions may be enabled and/or disabled in any desired fashion, while weights or other factors may be assigned to the conditions in any desired manner.

The present invention embodiments may employ any quantity or type of user interface (e.g., Graphical User Interface (GUI), command-line, prompt, etc.), where the interface may include any information arranged in any fashion. The interface may include any quantity of any types of input or actuation mechanisms (e.g., buttons, icons, fields, boxes, links, etc.) disposed at any locations to enter/display information and initiate desired actions via any suitable input devices (e.g., mouse, keyboard, etc.). The topologies may be displayed utilizing any quantity of any suitable symbols, icons or other graphics objects for information assets, connections and other characteristics (e.g., arrows, boxes, etc.), and any suitable indicators (e.g., symbols, objects, highlighting, flashing, etc.) to indicate problematic assets.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "includes", "including", "has", "having" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "unit," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of monitoring a plurality of information assets providing data for constructing a logical entity, wherein said information assets form a topology, said computer-implemented method comprising:
receiving an event message associated with an information asset selected from the plurality of information assets, said event message including information relating to one or more conditions of said associated information asset, wherein said event message includes values each associated with a corresponding one of said conditions, and wherein a status for said associated information asset is based on one or more of said conditions;
processing said received event message to determine the presence of a change within said associated information asset that affects said topology based on said information relating to said one or more conditions, wherein said processing said received event message comprises:
determining a status of each said condition contributing to said status for said associated information asset based on said values associated with said conditions;
combining said status of each said condition contributing to said status for said associated information asset to determine said status of said associated information asset; and
comparing said determined status of said associated information asset to a prior status to determine said change; and
transmitting a notification of said change to one or more entities in response to determining the presence of said change.

2. The computer-implemented method of claim 1, wherein each information asset is associated with one or more characteristics selected from a group consisting of operational characteristics and data quality characteristics and said event message further includes values each associated with a corresponding one of said characteristics, and wherein a status for said associated information asset is further based on one or more of said characteristics.

3. The computer-implemented method of claim 1, wherein said status of each said condition contributing to said status of said associated information asset includes a weighted value, and said combining said status includes:
combining said weighted values of each said condition contributing to said status for said associated information asset to produce an asset score; and
comparing said asset score to a threshold value to determine said status of said associated information asset.

4. The computer-implemented method of claim 1, wherein said change includes a change in said topology, wherein said topology includes a set of relationships between information assets, and wherein said event message includes information indicating an alteration of said set of relationships between said information assets, and said processing said received event message further comprises:
retrieving information from said received event message; and
determining the presence of said change in said topology in response to processing said retrieved information and identifying the presence of said information indicating said alteration to said set of relationships.

5. The computer-implemented method of claim 1, further comprising:
enabling a user to interact with said topology and to view information relating to said information assets and said topology via a user interface; and
transmitting said notification of said change within an information asset affecting said topology to said one or more entities in response to determining the presence of said change initiated by said user via said user interface.

6. The computer-implemented method of claim 1, wherein properties defining said information assets and said topology are provided by a file, and said computer-implemented method further comprises:
importing said file to establish said defined topology; and
transmitting said notification of said change within an information asset affecting said topology to said one or more entities in response to processing said file and comparing said properties of said defined topology to those of a prior topology.

7. A computer-implemented method of monitoring a plurality of information assets providing data for constructing a logical entity, wherein said information assets form a topology, said computer-implemented method comprising:
receiving an event message associated with an information asset selected from the plurality of information assets, wherein each information asset is associated with one or more conditions, and wherein said event message includes information relating to one or more conditions of said associated information asset;
processing said received event message to determine the presence of a change within said associated information asset that affects said topology based on said information relating to said one or more conditions, wherein said change includes a change in status of said topology, wherein said processing said received event message comprises:
retrieving said values associated with said conditions from said received event message and determining a status for each information asset within said topology based on said retrieved values;
combining said status of each said information asset within said topology to determine said status of said topology; and
comparing said determined status of said topology to a prior status to determine said change; and
transmitting a notification of said change to one or more entities in response to determining the presence of said change.

8. The computer-implemented method of claim 7, wherein each information asset within said topology is associated with a weighted asset value based on said retrieved values, wherein said combining said status comprises:
combining said weighted asset value of each information asset within said topology to produce a total asset score; and
comparing said total asset score to a threshold value to determine said status of said topology.

* * * * *